United States Patent [19]
Evans

[11] Patent Number: 5,761,894
[45] Date of Patent: Jun. 9, 1998

[54] GRASS STRIPING ATTACHMENT FOR LAWN MOWERS

[75] Inventor: Arthur Leon Evans, Putnam County, Ind.

[73] Assignee: Magic Circle Corporation, Coatesville, Ind.

[21] Appl. No.: 718,769

[22] Filed: Sep. 25, 1996

[51] Int. Cl.$^6$ ................................................. A01B 31/00
[52] U.S. Cl. .......................... 56/320.1; 56/1; 56/DIG. 5; 172/612; 172/684.5
[58] Field of Search ........................ 56/1, 2, 320.1, 56/17.4, DIG. 5, 400.01; 172/684.5, 612, 197, 199, 200, 189, 71, 72, 63

[56] References Cited

U.S. PATENT DOCUMENTS

| | | | |
|---|---|---|---|
| 1,150,936 | 8/1915 | Furnas | 172/612 |
| 1,183,238 | 5/1916 | Robertson | 172/612 |
| 1,428,283 | 9/1922 | Gunderson et al. | 172/612 |
| 1,530,329 | 3/1925 | Roberts | 172/684.5 |
| 1,594,085 | 7/1926 | Wills | 172/684.5 X |
| 1,786,194 | 12/1930 | Dickinson | 172/612 |
| 2,570,541 | 10/1951 | Gabrielson | 56/1 |
| 2,749,695 | 6/1956 | Hoopingarner | 56/1 X |
| 4,505,338 | 3/1985 | Koval et al. | 172/612 X |
| 4,582,142 | 4/1986 | Bridge | 172/612 X |
| 4,630,686 | 12/1986 | Ausmus, Jr. | 172/684.5 X |
| 4,836,295 | 6/1989 | Estes | 172/612 X |
| 4,989,676 | 2/1991 | Rogers | 172/684.5 X |
| 5,191,944 | 3/1993 | Thorn | 172/684.5 X |
| 5,419,647 | 5/1995 | Kirk et al. | 172/612 X |

Primary Examiner—Terry Lee Melius
Assistant Examiner—Christopher J. Novosad
Attorney, Agent, or Firm—Jack Schuman

[57] ABSTRACT

A plurality of heavy chains in lateral contact with adjacent chains is secured to a structural member such as an angle which, in turn, is removably secured to the rear of the frame of a lawn mower, behind the grass cutting mechanism, the chains being heavy enough and long enough to drag along a grass lawn, whereby the grass lawn can simultaneously be cut and striped.

3 Claims, 1 Drawing Sheet

GRASS STRIPING ATTACHMENT FOR LAWN MOWERS

BACKGROUND OF THE INVENTION

1. Field of the Invention

This invention relates, broadly speaking, to apparatus for striping grass.

More particularly, this invention relates to an accessory which can be attached to a lawn mower and used for striping grass.

2. Description of the Prior Art

The term "grass striping" as used herein, refers to the practice of orienting grass on lawns or playing fields in a uniform direction so as to improve the cosmetic appearance of such lawns or playing fields.

Grass striping is conventionally done by using a roller to achieve this effect. The roller, in each pass along the lawn or playing field, stripes the grass in a band, equal to the length of the roller. The process of striping the grass in successive contiguous bands is continued until all the grass is striped. In tending to a lawn or playing field one piece of apparatus is used for cutting the grass, and a separate piece of apparatus, the roller, is used for striping the grass after cutting. Thus, two separate pieces of equipment are required to adequately tend the grass by cutting and then striping. Thus, two separate operations, mowing and striping, are successively employed. Such sequence of steps is necessarily time-consuming, and for commercial grass cutting and striping operations, improved economy and efficiency are most desirable goals to be attained if one is to maintain a competitive edge over the competition.

SUMMARY OF THE INVENTION

One of the objects of this invention is to provide improved grass striping apparatus.

Another object of this invention is to provide a striping accessory which can be attached to the rear of the frame of a lawn mower and used for striping grass on lawns or playing fields or the like.

Still another object of this invention is to provide, in one piece of equipment, the capability of cutting grass and immediately thereafter striping the grass.

Yet another object of this invention is to provide a more economical and efficient apparatus for striping grass in conjunction with the cutting of the grass.

Still other and further objects of the invention will become apparent by reference to the accompanying specification and drawing, and to the appended claims.

The foregoing objects are attained by securing to a structural member, such as an angle, a plurality of heavy chains in lateral contact with each other, the said structural member with attached chains being removably secured to the rear of the frame of a lawn mower, behind the cutting mechanism, the chains being long enough to drag on the grass being striped. The striping attachment, comprising the structural member and chains, when secured to the rear of the frame of a lawn mower, permits the practically simultaneous cutting and striping of a lawn or playing field, thus effecting considerable economies in tending to the lawn or playing field.

DESCRIPTION OF THE PREFERRED EMBODIMENT

Figure 1:
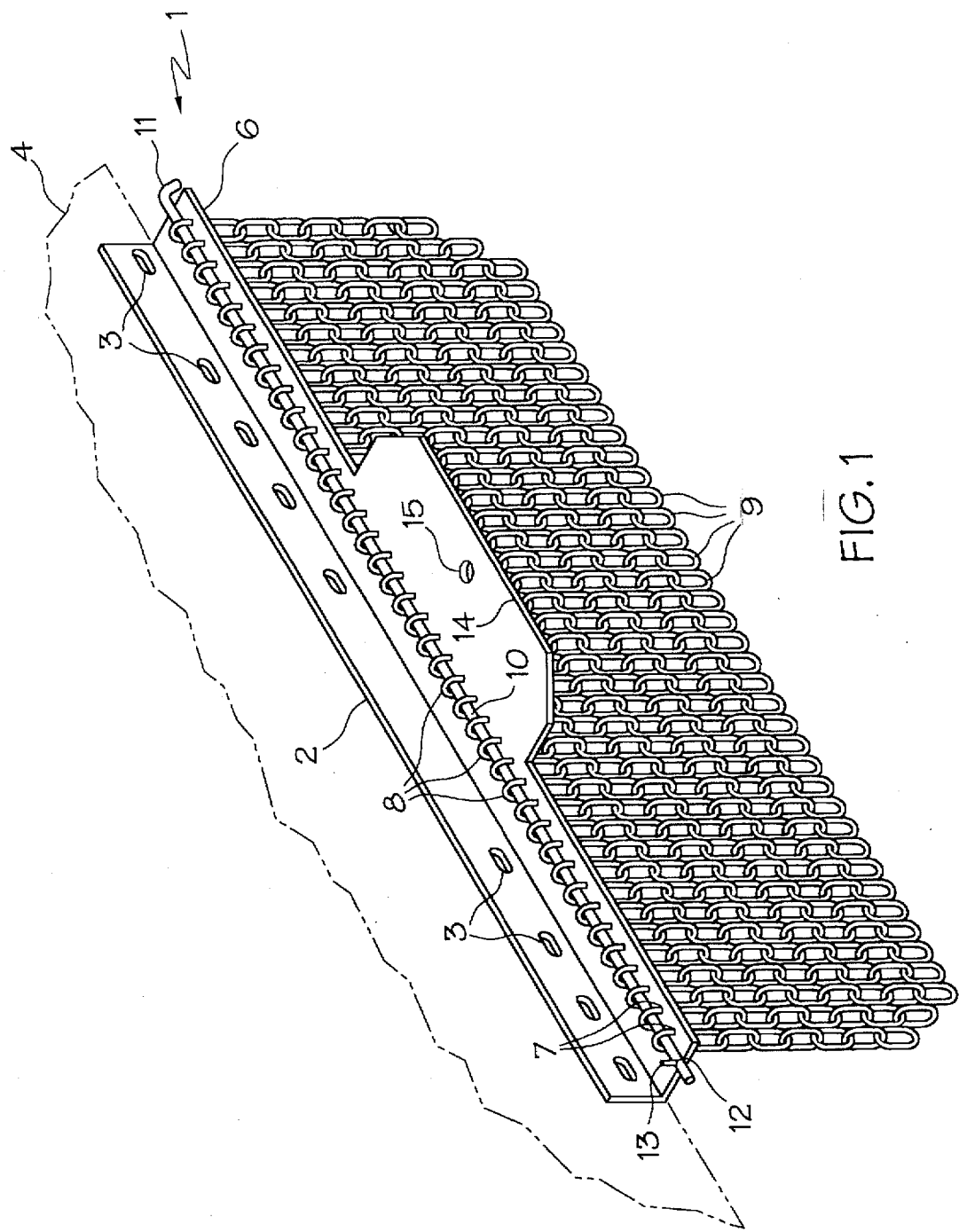
FIG. 1 represents a view in perspective of the present invention, showing the striping attachment with its suspended chains secured to the rear of the frame of a lawn mower, the latter being shown partially and in phantom.

Striping attachment 1 comprises structural member 2, preferably an angle, with holes 3 through which bolts (not shown) may be inserted to secure angle 2 to the rear of the frame 4 of a lawn mower.

One leg 6 of angle 2, the horizontal leg, is provided with slotted apertures 7 of length sufficient to permit the end links 8 of heavy chain 9 to extend therethrough. Slotted apertures 7 are so spaced along leg 6 that, when end links 8 of chains 9 are inserted therethrough, chains 9 will be in side-by-side, i.e., lateral, contact with adjacent chains 9.

Rod 10 extends along leg 6, adjacent the upper surface thereof and through end links 8, thereby to fixedly suspend chains 9 from angle 2. Suitable means are provided to hold rod 10 in place. Such means may, for example, comprise a 90° bend 11 formed at one end of rod 10, and an aperture 12 adjacent the other end thereof, through which aperture 12 a cotter pin may be inserted, the said cotter pin 13 extending through an aperture (not shown) in leg 6. In this manner, rod 10 is restrained from longitudinal movement which, if excessive, might cause some chains to drop from leg 6.

Leg 6 may be provided with flange 14 having aperture 15 therethrough for attachment of other accessories.

In use, striping attachment 1 is bolted to the rear of the frame 4 of a lawn mower, behind the cutting blades of the lawn mower, and the apparatus is ready for striping grass as an adjunct to cutting the grass with the lawn mower.

It will be noted that chains 9 must be long enough and heavy enough to drag on the grass being striped when the striping attachment 1 is secured to the lawn mower. Advantageously, chains 9 may be made from heavy gauge, rust-resistant metal.

Because chains 9 are suspended from leg 6 in side-by-side, i.e., lateral, contact with adjacent changes, no gaps in the striping will occur, and complete striping of the grass, from one end chain 9 to the other end chain 9 will be achieved.

When one or more chains wear to the point that they no longer function effectively as striping tools, cotter pin 13 may be withdrawn from aperture 12, rod 10 extracted longitudinally (i.e., to the right of FIG. 1), freeing chains 9 and permitting replacement of defective chains 9.

When it is desired simply to cut grass without striping, striping attachment 1, may be unbolted and removed from frame 4 of the lawn mower.

The present invention permits a higher quality striping operation virtually simultaneously with grass cutting, all with one piece of equipment and with one operator, speeding up the cutting and striping operation and thus permitting substantial economies to be realized, so as to afford a competitive edge over the competition in commercial cutting and striping.

Since modifications and changes which do not depart from the spirit of the invention as disclosed herein may readily occur to those skilled in the art to which this invention pertains, the appended claims should be construed as covering all suiotable modifications and equivalents.

What is claimed is:

1. Grass striping apparatus for use with a lawn mower to stripe a grass lawn, said lawn mower having a frame supporting a grass cutting mechanism, said apparatus comprising:

(a) a support member adapted to be removably secured to said frame behind said grass cutting mechanism, (b) a plurality of chains, each of said chains having an upper end and a lower end, (c) the upper ends of said chains being secured to said support member, each of said chains being in lateral contact with adjacent chains, (d) the lower ends of said chains being free of attachment to each other and being adapted to drag along said grass lawn being striped, (e) whereby said grass lawn can simultaneously be cut and striped.

2. Grass striping apparatus as in claim 1, further comprising:

(f) a horizontal flange on said support member, (g) an upper surface and a lower surface on said horizontal flange, (h) a plurality of apertures extending through said horizontal flange from the lower surface thereof through the upper surface thereof, (i) an upper link on the upper end of each of said chains, each of said upper links extending upwardly through one of said apertures and projecting above the upper surface of said horizontal flange, (j) an elongated member adjacent the upper surface of said horizontal flange, said elongated member extending through those portions of the upper links of said chains projecting above the upper surface of said horizontal flange, (k) whereby said chains are supported from said horizontal flange.

3. Grass striping apparatus as in claim 2, wherein:

(1) said elongated member is adapted to be withdrawn from those portions of the upper links of said chains projecting above the upper surface of said horizontal flange whereby to free said chains from support by said horizontal flange.

\* \* \* \* \*